Oct. 26, 1948.  J. W. KEHOE  2,452,057

FLEXIBLE LEAKPROOF COUPLING

Filed May 21, 1946

*INVENTOR.*
JAMES W. KEHOE.

BY

*F. J. Schmitt*

ATTORNEY.

Patented Oct. 26, 1948

2,452,057

UNITED STATES PATENT OFFICE 2,452,057

FLEXIBLE LEAKPROOF COUPLING

James W. Kehoe, Wauwatosa, Wis.

Application May 21, 1946, Serial No. 671,336

7 Claims. (Cl. 285—90)

(Granted under the act of March 3, 1883, as amended April 30, 1928; 370 O. G. 757)

This invention relates to a new and improved coupling for pipes, tubes and hose of various types suited to the transfer of gases or liquids under high or low pressures such as are encountered in fuel and oil supply lines as found in aircraft, automotive equipment, refrigeration, hydraulic and other similar systems where fluid pressures are involved.

It is customary to use hose couplings in piping systems between rigid and non-rigid mechanisms to reduce strains and to prevent the transmission of vibrations and also for electrical insulation. Such couplings are usually pieces of hose cut off in lengths to suit and depending on shellac and the tightness of the clamps to prevent leakage. In such installations the greater the pressure the greater the chance of leakage. In this invention, the greater the pressure the tighter the seal,- as the inner tapered edge of the rubber is pressed against the piping by the fluid pressure.

The principal object of the present invention is to provide a leak-proof flexible connection between containers such as that of two or more similar tubular containers made of various materials such as iron, copper, aluminum or other metals as well as those made of vulcanized rubber, plastics or any solid or flexible material suitable for the transfer or storage of a gas or a liquid and preferably of a tubular cross-section.

Another object of the invention is to provide tapered lips in the connector such that as the pressure on the joint of the two connected tubular containers increases the tapered lips will be compressed more tightly against the connected tubular containers thereby increasing the seal between the coupling and the tubular containers with a consequent reduction of leakage of the contained fluids.

A further object of the invention is to provide a flexible connection between two containers so that they can move angularly or laterally with respect to each other without any resultant leakage at the joint of the coupling.

And a further object of this invention is to provide a flexible coupling that double seals against leakage by means of its tapered edge engagement backed-up by commercial clamps making the use of shellac or other adhesives unnecessary. This also facilitates disengagement without damage to coupling.

A still further object of the invention is to provide a flexible coupling of the type described that can be quickly installed and secured by commercial clamps on any annular-section tubing.

Figure 1:
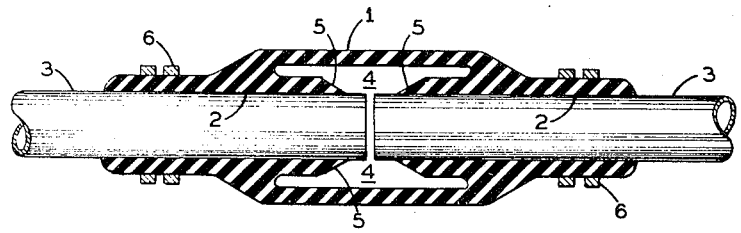
Figure 2:
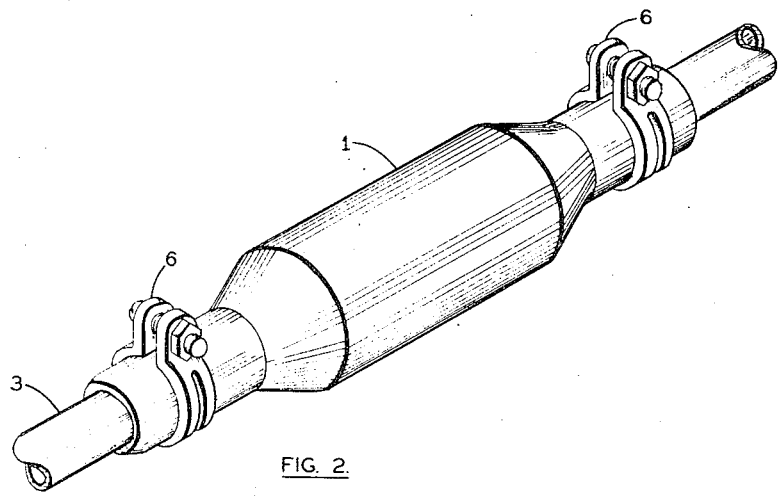

These and other objects of the invention and the various features and details of the construction and operation thereof, as hereinafter more fully set forth and described with reference to the accompanying drawings in which Fig. 1 shows a longitudinal sectional view and Fig. 2 an isometric view of this coupling invention.

Referring now to the drawings, Fig. 1 of the coupling made according to the present invention may comprise a body 1 of rubber or other flexible material having annular openings 2 suitably enclosing tubular containers 3 and containing a cavity 4 having integrally formed lips 5 so beveled and bearing on containers 3 that as a pressure is built up in cavity 4 the beveled lips 5 will be compressed proportionally and circumferentially on tubular containers 3 thereby sealing the joints between lips 5 and containers 3 against any leaks of the contained fluids directly as their pressures increase.

Clamps 6 contract body 1 against tubular containers 3 in annular openings 2 as an additional seal against leakage, and to better secure the coupling 1 to the container 3.

Body 1 may be pressed on to tubular containers 3 so as to form a tight joint between the members 2 and 3 making them more leak-proof and holding the assembly in an axial relation between the body 1 and containers 3.

From the foregoing it will be observed that the present invention provides a well-designed efficient vibrationless and dielectric coupling adaptable for use on a wide range of industrial and mechanical equipment. The invention is also relatively simple and inexpensive to manufacture, and easy to install or remove.

While a particular embodiment of the invention has been illustrated and described herein, it is not intended that the invention be limited to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. An integral coupling member having cylindrical end portions, a cylindrical center portion having an outside diameter greater than the diameter of said end portions, a longitudinal bore centrally disposed in said coupling member and passing through said end and center portions, a chamber annularly disposed within and co-extensive in length with the length of said center portion, and an annular passage in said center portion connecting said chamber and said longitudinal bore, said coupling member being fabricated of a flexible material.

2. The integral coupling member of claim 1 in which the portions of said coupling member included between said chamber, said annular passage and said longitudinal bore are adapted to form a pair of annular beveled lips.

3. A flexible coupling for connecting fluid flow lines comprising, a pair of tubular shaped members each adapted to receive a flow line, a cylindrical member having an outside diameter greater than the diameter of the tubular members and connecting said tubular members at points intermediate their respective ends, an annular chamber disposed in said cylindrical member and extending over the inner ends of the tubular members, a longitudinal bore extending through said tubular members and communicating with said chamber whereby fluid pressure in the flow lines enters the chamber and exerts pressure on the inner ends of said tubular members to provide sealed connections between the tubular members and the flow lines.

4. A flexible coupling for connecting fluid flow lines comprising, a pair of tubular shaped members each adapted to receive a flow line, a cylindrical member having an outside diameter greater than the diameter of the tubular member and connecting said tubular members at points intermediate their respective ends, an annular chamber disposed in said cylindrical member and extending over and about the inner ends of the tubular members, a portion of each of the inner ends tapered to form beveled lips for snug engagement with a flow line, a longitudinal bore extending through said tubular members and communicating with said chamber whereby fluid pressure in the flow lines enter the chambers and exerts pressure on the beveled lips to provide sealed connections between the tubular members and the flow lines, said coupling being fabricated of a flexible material.

5. The flexible coupling member of claim 4 in which the outer ends of the tubular members are provided with clamps for holding the outer ends of the tubular members in leakproof engagement with the flow lines.

6. A flexible coupling for connecting fluid flow lines, said coupling comprising: a pair of end members each having a longitudinal bore extending therethrough, each of said members being adapted to receive a flow line; and an outer central member connected to said end members at points intermediate their ends, said central member having a chamber communicating with the longitudinal bores and extending over the inner ends of said end members.

7. A flexible coupling for connecting fluid flow lines, said coupling comprising: a pair of end members each having a longitudinal bore extending therethrough, each of said members being adapted to receive a flow line; and an outer central member connected to an intermediate point on each of said end members, said central member having an intermediate portion thereof spaced from said end members.

JAMES W. KEHOE.

REFERENCES CITED

The following references are of record in the file of this patent:

UNITED STATES PATENTS

| Number | Name | Date |
| --- | --- | --- |
| Re. 20,706 | Aghnides | Apr. 26, 1938 |
| 603,222 | McLean | Apr. 26, 1898 |
| 809,903 | Bowers | Jan. 9, 1906 |